United States Patent Office 3,799,920
Patented Mar. 26, 1974

3,799,920
1,4-BENZODIAZEPINE DERIVATIVES
Giorgio Ferrari, Milan, and Cesare Casagrande, Como, Italy, assignors to Siphar S.A., Lugano, Switzerland
No Drawing. Filed Aug. 19, 1971, Ser. No. 173,305
Claims priority, application Switzerland, Aug. 24, 1970, 12,627/70
Int. Cl. C07d 53/06
U.S. Cl. 260—239.3 D         17 Claims

ABSTRACT OF THE DISCLOSURE

The invention relates to a process for preparing 1,4-benzodiazepine derivatives which contain a carbamic ester group, having interesting therapeutic properties and, more particularly, a myorelaxing effect, corresponding to the general formula:

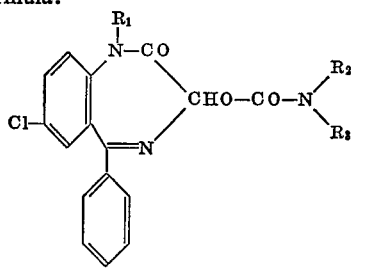

(I)

wherein the radical $R_1$ is hydrogen or a lower alkyl of 1 to 4 carbon atoms, and $R_2$ and $R_3$ are, each, hydrogen, a lower alkyl of 1 to 4 carbon atoms, a cycloalkyl or lower alkyl bearing as a substituent an amine or hydroxy group, and the radicals $R_2$ and $R_3$ can also make up, conjointly, a polymethylene chain, or also a polymethylene chain containing one hetero-atom, the process starting from compounds of class of 3-hydroxy-benzodiazepinones.

---

This invention relates to a group of novel 1,4-benzodiazepine derivatives which contain a carbamic ester group and have interesting therapeutic properties.

These compounds have the general formula:

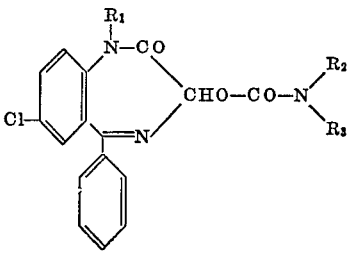

(I)

wherein the radical $R_1$ is a hydrogen atom or a lower alkyl radical of from 1 to 4 carbon atoms, and the radicals $R_2$ and $R_3$ are, each, a hydrogen atom, a lower alkyl radical having from 1 to 4 carbon atoms, a cycloalkyl radical or a lower alkyl radical which has been substituted with an amino or hydroxy grouping. The radicals $R_2$ and $R_3$ can also make up, conjointly, a polymethylene chain, or also a polymethylene chain containing one hetero-atom, such as oxygen or nitrogen, so as to form, as a unit, a saturated heterocyclic group, such as the pyrrolidino, piperidino, morpholino, piperazino groups.

In order to permit an easier understanding of the scope of the present invention, it is fitting to recall that in 1962 Sell and Childress (Wyeth Laboratories Inc., a firm subsidiary of the American Home Products) reported (J. Org. Chem. 27, 1961 (1962)) the conversion of benzodiazepinone-4-oxides, by reaction with acetic anhydride, to 3-acetoxy-benzodiazepinones, the latter being converted to hydrolysis to 3-hydroxy-benzodiazepinones according to the reaction scheme:

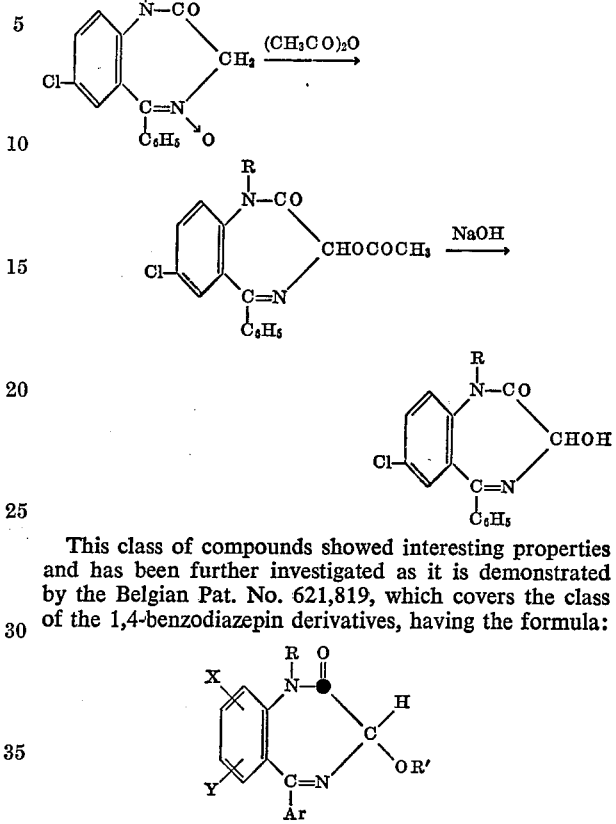

This class of compounds showed interesting properties and has been further investigated as it is demonstrated by the Belgian Pat. No. 621,819, which covers the class of the 1,4-benzodiazepin derivatives, having the formula:

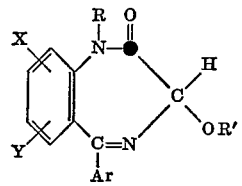

wherein R and R' are hydrogen or alkyl, X and Y are hydrogen or halogen, and Ar is an aryl.

Starting from this status of the art, the compounds of the Formula I have been developed, these compounds having shown several advantages from the therapeutical point of view with respect to those of the prior art.

In fact the compounds according to the present invention, as a consequence of the added groups, show outstanding therapeutical properties, since greater tolerability for a more favorable therapeutical index is obtained and mainly a very reduced myorelaxing effect is observed in comparison with the above said prior known compounds. Such a reduced myorelaxing effect allows a more intense therapy, since the asthenizing effect, characteristic of the known compounds, is lacking.

Benzodiazepine derivatives lying within the scope of this invention are:

3-carbamoyloxy-7-chloro-5-phenyl-1,3-dihydro-2H-1,4-benzodiazepin-2-one.
3-N-methylcarbamoyloxy-7-chloro-5-phenyl-1,3-dihydro-2H-1,4-benzodiazepin-2-one.
3-N,N-dimethylcarbamoyloxy-7-chloro-5-phenyl-1,3-dihydro-2H-1,4-benzodiazepin-2-one.
3-N-(beta-hydroxyethyl)carbamoyloxy-7-chloro-5-phenyl-1,3-dihydro-2H-1,4-benzodiazepin-2-one.
3-N-n-butylcarbamoyloxy-7-chloro-5-phenyl-1,3-dihydro-2H-1,4-benzodiazepin-2-one.
3-N-cyclohexylcarbamoyloxy-7-chloro-5-phenyl-1,3-dihydro-2H-1,4-benzodiazepin-2-one.
3-N(beta-diethylaminoethyl)carbamoyloxy-7-chloro-5-phenyl-1,3-dihydro-2H-1,4-benzodiazepin-2-one.
3-(4-methylpiperazino)carbonyloxy-7-chloro-5-phenyl-1,3-dihydro-2H-1,4-benzodiazepin-2-one.

3-piperidinocarbonyloxy-7-chloro-5-phenyl-1,3-dihydro-2H-1,4-benzodiazepin-2-one.
3-carbamoyloxy-1-methyl-7-chloro-5-phenyl-1,3-dihydro-2H-1,4-benzodiazepin-2-one.
3-N-methylcarbamoyloxy-1-methyl-7-chloro-5-phenyl-1,3-dihydro-2H-1,4-benzodiazepin-2-one.
3-N,N-dimethylcarbamoyloxy-1-methyl-7-chloro-5-phenyl-1,3-dihydro-2H-1,4-benzodiazepin-2-one.
3-(4-methylpiperazino)carbonyloxy-1-methyl-7-chloro-5-phenyl-1,3-dihydro-2H-1,4-benzodiazepin-2-one.
3-piperidinocarbonyloxy-1-methyl-7-chloro-5-phenyl-1,3-dihydro-2H-1,4-benzodiazepin-2-one.
3-morpholinocarbonyloxy-1-methyl-7-chloro-5-phenyl-1,3-dihydro-2H-1,4-benzodiazepin-2-one.
3-pyrrolidinocarbonyloxy-1-methyl-7-chloro-5-phenyl-1,3-dihydro-2H-1,4-benzodiazepin-2-one.

The present invention also relates to a method of preparation of the above enumerated compounds, this method comprising two steps, according to the following reaction run:

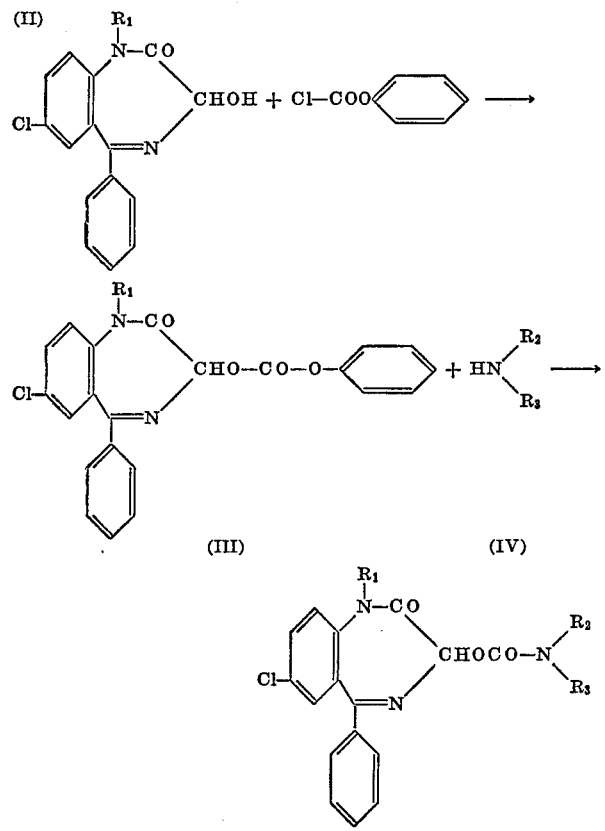

In the first stage, a benzodiazepine derivative having the Formula II, wherein $R_1$ has the meaning as specified above, is reacted, in an inert solvent and in the presence of an appropriate hydrogen chloride acceptor, with phenyl chlorocarbonate, a carbonic ester having the formula III being formed at a temperature in the range 0° C.–70° C.

As inert solvents there can be used hydrocarbons, such as benzene, compounds having ethereal functions such as dioxane, ketones, such as acetone, tertiary heterocyclic bases, such as pyridine. As hydrogen chloride acceptors, there can be used alkali metal and alkaline earth metal carbonates and bicarbonates, such as sodium bicarbonate, tertiary amines, such as triethylamine, or tertiary heterocyclic bases, such as pyridine. More particularly, pyridine can be used, with advantage, in the two-fold function of solvent and hydrogen chloride acceptor.

Preferred conditions for the first stage of the method are the performance of the reaction between phenyl chlorocarbonate and the benzodiazepine derivative having the Formula I in pyridine at a temperature comprised between 0° C. and 25° C.

In the second stage of the method, the carbonic ester having the Formula III is caused to react with an amino compound having the Formula IV wherein $R_2$ and $R_3$ have the above indicated meanings.

Thus,

can be ammonia, when $R_2=R_3=$hydrogen, or a primary amine (for example when $R_2=$methyl and $R_3=$hydrogen); or a secondary amine (for example when $R_2=R_3=$methyl) or a saturated heterocyclic base, such as pyrrolidine, morpholine. The second stage of the method can be carried out in an appropriate solvent, at a temperature comprised between 0° C. and 80° C., in the presence of at least a stoichiometric amount, and preferably an excess, of the amine. Preferably, as the solvents, there can be used lower alcohols or compounds having ethereal functions, such as methanol, isopropanol, dioxane. The amount of amine employed is preferably from 1.2 to 10 mols per mol of the carbonic ester. The reaction is preferably carried out at a temperature comprised between 15° C. and 30° C.

The compounds of the present invention are endowed with considerable tranquilizing and antianxiety properties and are weakly toxic. They are almost devoid of the depressing and myorelaxing properties which are responsible of the undesirable side effects proper of certain tranquilizing substances as employed in therapeutics. The compounds of the present invention thus provide a group of substances which can be employed in the treatment of psychic troubles and states of anxiety. This invention also relates to pharmaceutical compositions which contains, as the active ingredients, the above enumerated substances, in dosages which are comprised between 1 and 20 milligrams. As examples of pharmaceutical compositions there can be cited the tablets, dragées, and capsules for oral administration, solutions and suspensions both for oral and parentheral use, and suppositories. The substances of the present invention can be formulated either alone or in combination with other drugs suitable for the treatment of psychical ailments, so as to supplement and extend the therapeutic use thereof.

Appropriate nontoxic vehicles or diluents suitable for pharmaceutical use, can be used for the formulations.

The following examples should be regarded as illustrative but not limiting, for the present invention. The melting points have not been corrected.

EXAMPLE 1

A suspension of 100 grs. of 7-chloro-5-phenyl-3-hydroxy-1,3-dihydro-2H-1,4-benzodiazepin-2-one in 700 mls. of anhydrous pyridine, kept stirred between 0° C. and +5° C., is slowly treated, during 20–30 minutes, with 54.5 ml. phenyl chlorocarbonate. The temperature is gradually allowed to rise to 20° C.–25° C. and stirring is maintained at this temperature during 24 hours.

Two liters of water are then slowly added (during about 30 minutes) and stirring is maintained during one hour. The precipitate which has been formed is collected on a filter, washed thoroughly with water, dried in a vacuo at 50° C. and recrystallized by dissolving it at 60° C. in 1,400 mls. dioxane, the solution thus obtained being evaporated under reduced pressures to one half of its volume, and 1,700 mls. of ligroin (B.P. 80° C.–120° C.) being added thereto.

7-chloro-5-phenyl - 3 - phenoxycarbonyloxy - 1,3 - dihydro-2H-1,4-benzodiazepin-2-one is thus obtained, with a M.P. of 162° C.–164° C.

EXAMPLE 2

By adopting the same procedure of Example 1, but replacing 7-chloro-5-phenyl - 3 - hydroxy-1,3-dihydro-2H-1,4-benzodiazepin-2-one with an equivalent amount of 7-chloro - 5 - phenyl-3-hydroxy-1-methyl-1,3-dihydro-2H-1,4-benzodiazepin-2-one, one obtains, 7-chloro-5-phenyl-3-phenoxycarbonyloxy - 1 - methyl - 1,3 - dihydro-2H-1,4-benzodiazepin-2-one which, recrystallized from dioxane-ethanol shows a M.P. of 176° C.–178° C.

EXAMPLE 3

A suspension of 45 grs. 3-phenoxycarbonyloxy-1-methyl-7-chloro - 5 - phenyl-1,3-dihydro-2H-1,4-benzodiazepin-2-one in 450 mls. methanol is treated, with stirring, with 43 mls. of a solution of dimethylamine in methanol (containing 31 grs. dimethylamine in 100 mls.). Stirring is maintained at 20° C.–25° C. during 5 hours. The reaction mixture is filtered, and the filtrate is diluted with 450 mls. water. The precipitate thus formed, is 3-(N,N-dimethylcarbamoyloxy)-1-methyl - 7 - chloro-5-phenyl-1,3-dihydro-2H-1,4-benzodiazepin-2-one, which is collected on a filter, dried and recrystallized from ethyl acetate, and has a M.P. of 173° C.–174° C.

EXAMPLE 4

A suspension of 25 grs. of 3-phenoxycarbonyloxy-1-methyl-7-chloro-5-phenyl-1,3-dihydro-2H - 1,4 - benzodiazepin-2-one is treated, while cooling at 5° C. and stirring, with 23 grs. pure methylamine. The mixture is kept stirred during 12 hours at 20° C.–25° C. The precipitate is collected on a filter, washed with methanol and recrystallized from dioxane-ligroin and a M.P. of 227° C.–229° C. In the same manner, and by employing an equivalent amount of ammonia instead of methylamine, one obtains 3-carbamoyloxy - 1 - methyl - 7 - chloro-5-phenyl-1,3-dihydro - 2H - 1,4 - benzodiazepin-2-one, M.P. 216° C.–218° C. (recrystallized from dioxane-ligroin). Likewise, when starting from 3-phenoxycarbonyloxy-7-chloro-2,3-dihydro - 2H - 1,4 - benzodiazepin-2-one and employing ammonia, methylamine, dimethylamine and nor.butylamine, respectively, the following compounds have been obtained:

3-carbamoyloxy-7-chloro-5-phenyl-1,3-dihydro-2H-1,4-benzodiazepin-2-one, M.P. 230° C.–232° C.
3-N-methylcarbamoyloxy-7-chloro-5-phenyl-1,3-dihydro-2H-1,4-benzodiazepin-2-one, M.P. 230° C.–231° C.
3-N,N-dimethylcarbamoyloxy-7-chloro-5-phenyl-1,3-dihydro-2H-1,4-benzodiazepin-2-one, M.P. 234° C.–235° C.
3-N-n-butylcarbamoyloxy-7-chloro-5-phenyl-1,3-dihydro-2H-1,4-benzodiazepin-2-one, M.P. 214° C.–215° C.

EXAMPLE 5

A suspension of 50 grs. of 3-phenoxycarbonyloxy-7-chloro-5-phenyl - 1,3 - dihydro-2H-1,4-benzodiazepin-2-one in 900 mls. methanol is treated at 20° C. with 50 grs. N-methylpiperazine. The mixture is kept stirred at 20° C.–25° C. during 15 hours, the precipitate is collected on a filter and crystallized from dimethylformamide-ethylacetate. 3-(4-methylpiperazino)carbonyloxy-7-chloro-5-phenyl-1,3-dihydro-2H - 1,4 - benzodiazepin-2-one, is thus obtained, having a M.P. of 233° C.–234° C.

In the same way, by using, instead of N-methylpiperazine, an equivalent amount of piperidine, one obtains 3-piperidinocarbonyloxy-7-chloro-5-phenyl - 1,3 - dihydro-2H-benzodiazepin-2-one, having a M.P. of 224° C.–226° C. (from ethyl acetate).

Likewise, starting from 3-phenoxycarbonyloxy-1-methyl-7-chloro - 5 - phenyl - 1,3 - dihydro-2H-1,4-benzodiazepin-2-one and employing N-methylpiperazine, piperidine, morpholine and pyrrolidine, respectively, the following compounds are obtained:

3-(4-methylpiperazino)carbonyloxy - 1 - methyl-7-chloro 5-phenyl-1,3-dihydro - 2H - 1,4 - benzodiazepin-2-one, M.P. 185° C.– 187° C.
3-piperidinocarbonyloxy - 1 - methyl - 7 - chloro-5-phenyl-1,3-dihydro - 2H - 1,4 - benzodiazepin-2-one, M.P. 201° C.–203° C.
3-morpholinocarbonyloxy - 1 - methyl - 7 - chloro-5-phenyl - 1,3 - dihydro-2H-1,4-benzodiazepin - 2 - one, M.P. 200° C.–202° C.
3-pyrrolidinocarbonyloxy - 1 - methyl-7-chloro-5-phenyl-1,3-dihydro-2H-1,4-benzodiazepin-2-one, M.P. 210° C.–212° C.

EXAMPLE 6

A suspension of 8 grs. of 3-phenoxycarbonyloxy-7-chloro-5-phenyl - 1,3 - dihydro - 2H - 1,4 - benzodiazepin-one in 60 mls. ethanol is treated with 14 ml. ethanolamine, stirring is maintaind during one hour, the mass is diluted with 200 mls. water, the precipitate is collected on a filter and recrystallized from ethanol. 3-N-(beta-hydroxyethyl) carbamoyloxy - 7 - chloro - 5 - phenyl-1,3-dihydro-2H-1,4-benzodiazepin-2-one is thus obtained, having a M.P. of 168° C.–170° C.

EXAMPLE 7

A suspension of 20 grs. of 3-phenoxycarbonyloxy-7-chloro - 5 - phenyl - 1,3 - dihydro-2H-1,4-benzodiazepin-2-one in 100 mls. dioxane is treated with 20 mls. of cyclohexylamine. Stirring is maintained during 48 hours at 20° C.–25° C., then the mass is diluted with 200 mls. water, the precipitate is collected on a filter and washed with alcohol, and recrystallized from dioxane-ethanol. 3-N-cyclohexylcarbamoyloxy - 7-chloro-5-phenyl-1,3-dihydro-2H-1,4-benzodiazepin-2-one is thus obtained, which has a M.P. of 231° C.–233° C.

EXAMPLE 8

A suspension of 7 grs. of 3-phenoxycarbonyloxy-7-chloro - 5 - phenyl - 1,3 - dihydro-2H-1,4-benzodiazepin-2-one in 50 mls. ethanol is treated with 15 grs. N,N-diethylethylenediamine. Stirring is maintained at 20° C.–25° C. during 48 hours, the major fraction of methanol is evaporated under reduced pressures, the residue is washed by standing with water, dried and crystallized from acetone-petroleum ether. N-(beta-diethylaminoethyl)carbamoyloxy-7-chloro - 5 - phenyl - 1,3 - dihydro-1,4-benzodiazepin-2-one is thus obtained, having a M.P. of 169° C.–170° C.

What we claim is:

1. A compound having the formula:

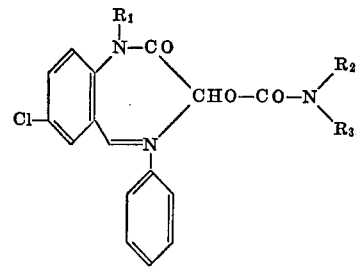

wherein $R_1$ is hydrogen, or a lower alkyl having from 1 to 4 carbon atoms and $R_2$ and $R_3$ are, each, hydrogen, lower alkyl having from 1 to 4 carbon atoms, cyclohexyl or amino lower alkyl or hydroxy lower alkyl, or when $R_2$ and $R_3$ are taken together with the attached nitrogen atom form, a heterocyclic ring selected from the group consisting of pyrrolidino, piperidino, morpholino, and piperazino.

2. 3-carbamoyloxy - 7 - chloro - 5 - phenyl-1,3-dihydro-2H-1,4-benzodiazepin-2-one.

3. 3-N-methylcarbamoyloxy - 7 - chloro - 5 - phenyl-1,3-dihydro-2H-1,4-benzodiazepin-2-one.

4. 3-N,N-dimethylcarbamoyloxy - 7 - chloro-5-phenyl-1,3-dihydro-2H-1,4-benzodiazepin-2-one.

5. 3-N-(beta-hydroxyethyl)carbamoyloxy - 7 - chloro-5-phenyl-1,3-dihydro-2H-1,4-benzodiazepin-2-one.

6. 3-N-n-butylcarbamoyloxy - 7 - chloro - 5 - phenyl-1,3-dihydro-2H-1,4-benzodiazepin-2-one.

7. 3-N-cyclohexylcarbamoyloxy - 7 - chloro-5-phenyl-1,3-dihydro-2H-1,4-benzodiazepin-2-one.

8. 3 - N - (beta - diethylaminoethyl)carbamoyloxy-7-chloro-5-phenyl-1,3-dihydro-2H-1,4-benzodiazepin-2-one.

9. 3-(4-methylpiperazino)carbonyloxy - 7 - chloro-5-phenyl-1,3-dihydro-2H-1,4-benzodiazepin-2-one.

10. 3-piperidinocarbonyloxy - 7 - chloro - 5 - phenyl-1,3-dihydro-2H-1,4-benzodiazepin-2-one.

11. 3-carbamoyloxy - 1 - methyl - 7 - chloro-5-phenyl-1,3-dihydro-2H-1,4-benzodiazepin-2-one.

12. 3-N-methylcarbamoyl-1-methyl-7-chloro-5-phenyl-1,3-dihydro-2H-1,4-benzodiazepin-2-one.

13. 3-N,N-dimethylcarbamoyloxy - 1 - methyl-7-chloro-5-phenyl-1,3-dihydro-2H-1,4-benzodiazepin-2-one.

14. 3-(4-methylpiperazino)carbonyloxy - 1 - methyl-7-chloro-5-phenyl-1,3-dihydro-2H-1,4-benzodiazepin-2-one.

15. 3-piperidinocarbonyloxy - 1 - methyl - 7 - chloro-5-phenyl-1,3-dihydro-2H-1,4-benzodiazepin-2-one.

16. 3-morpholinocarbonyloxy - 1 - methyl - 7 - chloro-5-phenyl-1,3-dihydro-2H-1,4-benzodiazepin-2-one.

17. 3-pyrrolidinocarbonyloxy - 1 - methyl -7 - chloro-5-phenyl-1,3-dihydro-2H-1,4-benzodiazepin-2-one.

References Cited
UNITED STATES PATENTS 3,296,249  1/1967  Bell _____ 260—239.3 D HENRY R. JILES, Primary Examiner R. T. BOND, Assistant Examiner U.S. Cl. X.R.

424—244

UNITED STATES PATENT OFFICE
CERTIFICATE OF CORRECTION

Patent No. 3,799,920              Dated March 26, 1974

Inventor(s) Giorgio Ferrari and Cesare Casagrande

It is certified that error appears in the above-identified patent and that said Letters Patent are hereby corrected as shown below:

In the heading of the patent "Claims priority, application Switzerland, August 24, 1970, 12,627/70 has been corrected to read:
-- Claims priority, application Switzerland, August 24, 1970, 12,620/70.--

Signed and sealed this 29th day of October 1974.

(SEAL)
Attest:

McCOY M. GIBSON JR.
Attesting Officer

C. MARSHALL DANN
Commissioner of Patents